(12) United States Patent
Rickard et al.

(10) Patent No.: US 6,587,079 B1
(45) Date of Patent: Jul. 1, 2003

(54) OBJECT LOCATION

(75) Inventors: David Charles Rickard, Wiltshire (GB); James William Horne, Hampshire (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 09/979,008

(22) PCT Filed: May 11, 2000

(86) PCT No.: PCT/GB00/01801

§ 371 (c)(1),
(2), (4) Date: Feb. 11, 2002

(87) PCT Pub. No.: WO00/70363

PCT Pub. Date: Nov. 23, 2000

(30) Foreign Application Priority Data

May 14, 1999 (GB) .............................................. 9911135

(51) Int. Cl.$^7$ ................................................. G01S 1/24
(52) U.S. Cl. .................. 342/387; 342/357.01; 342/459
(58) Field of Search ....................... 342/357.01, 357.06, 342/387, 450, 457, 459

(56) References Cited

U.S. PATENT DOCUMENTS

| 4,866,450 A | 9/1989 | Chisholm | 342/410 |
| 5,317,323 A | 5/1994 | Kennedy et al. | 342/457 |
| 5,382,958 A | 1/1995 | FitzGerald | 342/386 |
| 5,717,406 A | 2/1998 | Sanderford et al. | 342/457 |
| 5,757,786 A | 5/1998 | Joo | 370/324 |
| 5,883,596 A | 3/1999 | Rodal | 342/457 |

FOREIGN PATENT DOCUMENTS

| EP | 0 006 594 A1 | 6/1979 |
| EP | 0 120 520 A1 | 2/1984 |
| EP | 0 733 912 A2 | 1/1996 |
| GB | 2 250 154 A | 11/1990 |
| GB | 2 283 142 A | 9/1993 |
| GB | 2 310 098 A | 2/1996 |

OTHER PUBLICATIONS

The Development of a Prototype Aircraft Height Monitoring Unit Utilsing an SSR–Based Difference in Time of Arrival Technique; D.C. Richard et al; pp. 250–253.
The Marconi Review Volumne XLVI, No. 228, First Quarter 1983; *Height Measurement by Quadrilateration*; D.E. Rice Bsc., MIEE; pp. 1–17.
Copy of International Search Report.
Copy of British Search Report.

*Primary Examiner*—Dao Phan
(74) *Attorney, Agent, or Firm*—Crowell & Moring LLP

(57) ABSTRACT

A system for locating an object that produces identifying signals comprises a plurality of receiver sites arranged in an array for receiving signals from the object and for receiving a common time reference in the form signals received from a global navigation system. The array comprises a reference receiver site and three auxiliary receiver sites that are connected to the reference site by data links. Each receiver site receives signals from the object and timing control signals from a global navigation system. Each site determines a time difference between the receipt of the object signals and the timing signals, the auxiliary sites providing data signals on data links to the reference site where the location of the object is determined.

6 Claims, 2 Drawing Sheets

OBJECT LOCATION

BACKGROUND OF THE INVENTION

The present invention relates to a method and apparatus for locating an object that provides identifying signals.

There are several techniques which can be utilised to locate the position of an object relative to a reference point, for example, the position of an aircraft with respect to one of a plurality of sites. One such technique is described in GB-B-2 250 154.

In GB-B-2 250 154, an object location system is described in which a master or reference receiver and a plurality of auxiliary receivers are precisely located with respect to one another for receiving signals from an object. The signals received at the receivers from the object comprise secondary surveillance radar (SSR) generated by the object. Each auxiliary receiver is synchronised with respect to a signal sent from the reference receiver so that a computation device associated with the reference receiver can determine the precise location of the object from signals received at all the receivers. In this system, the reference receiver and at least three other auxiliary receivers are required to generate four simultaneous equations which are solved by the computation device to provide the position of the object in three dimensions and the distance the object is from the reference receiver.

SSR is also used to effect synchronisation between the reference receiver site and the auxiliary receiver sites. Each auxiliary receiver site utilises an atomic clock for driving a free running counter which is read on reception of an SSR signal transmitted thereto from the reference receiver site. However, in the object location system described in GB-B-2 250 154, it is necessary for each auxiliary receiver site to have a direct 'line of sight' with the master or reference receiver'site so that the timing signals can be received.

Another technique for providing synchronisation between the reference receiver and the auxiliary receivers disclosed in GB-B-2 250 154 utilises the global positioning system (GPS), GPS being used at each receiver site to provide both accurate location and intersite clock synchronisation.

SUMMARY OF THE INVENTION

It is therefore an object of the present invention to provide an object location system which does not have the disadvantages mentioned above.

In accordance with one aspect of the present invention, there is provided a method of locating the position of an object which provides identifying signals using a receiver array comprising a reference receiver site and at least three auxiliary receiver sites which are not on a line of sight with the reference receiver site, the method comprising the steps of:

receiving the identifying signals from the object at each receiver site;

receiving signals from a global navigation system at each receiver site and using the received signals for providing timing signals;

providing a clock at each receiver site for providing clock signals;

combining the timing signals with the clock signals to provide a timing reference signal at each receiver site;

determining the time difference between receiving the identifying signals and the timing reference signal at each receiver site;

transmitting data signals to the reference receiver site which are indicative of the determined time differences at each auxiliary receiver site; and calculating the position of the object using the transmitted data signals and the time difference determined at the reference receiver site.

By the term 'line of sight' is meant a direct line between the two points without the presence of any obstacles.

In accordance with another aspect of the present invention, there is provided apparatus for locating an object producing identifying signals, the apparatus comprising:

a receiver array comprising a reference receiver site and at least three auxiliary receiver sites which are not on a line of sight with the reference receiver site;

first receiver means at each receiver site for receiving the identifying signals from the object;

second receiver means at each receiver site for receiving timing signals from a global navigation system;

clock means at each receiver site for generating clock signals;

combining means at each receiver site for combining the timing signals and clock signals to provide a timing reference signal;

processing means at each receiver site for receiving signals from the first receiver means and the combining means and for providing a time difference measurement from the received signals; and control means at the reference receiver site for receiving data signals from the auxiliary receiver sites indicative of the time difference measurement signals determined thereat, and for processing the data signals together with the time difference measurement from the reference receiver site to provide a determination of the location of the object.

Other objects, advantages and novel features of the present invention, will become apparent from the following detailed description of the invention when considered in conjunction with the accompanying drawings.

DETAILED DESCRIPTION OF THE INVENTION

Although the present invention will be described with reference to height location of an aircraft, it will readily be appreciated that the invention can be utilised to determine the location of any object which produces an identifying signal.

Moreover, it will be appreciated that although the present invention will be described using the global positioning system (GPS), any global navigation system and augmentations, for example, global navigation satellite systems (GNSS), can be implemented.

Figure 1:
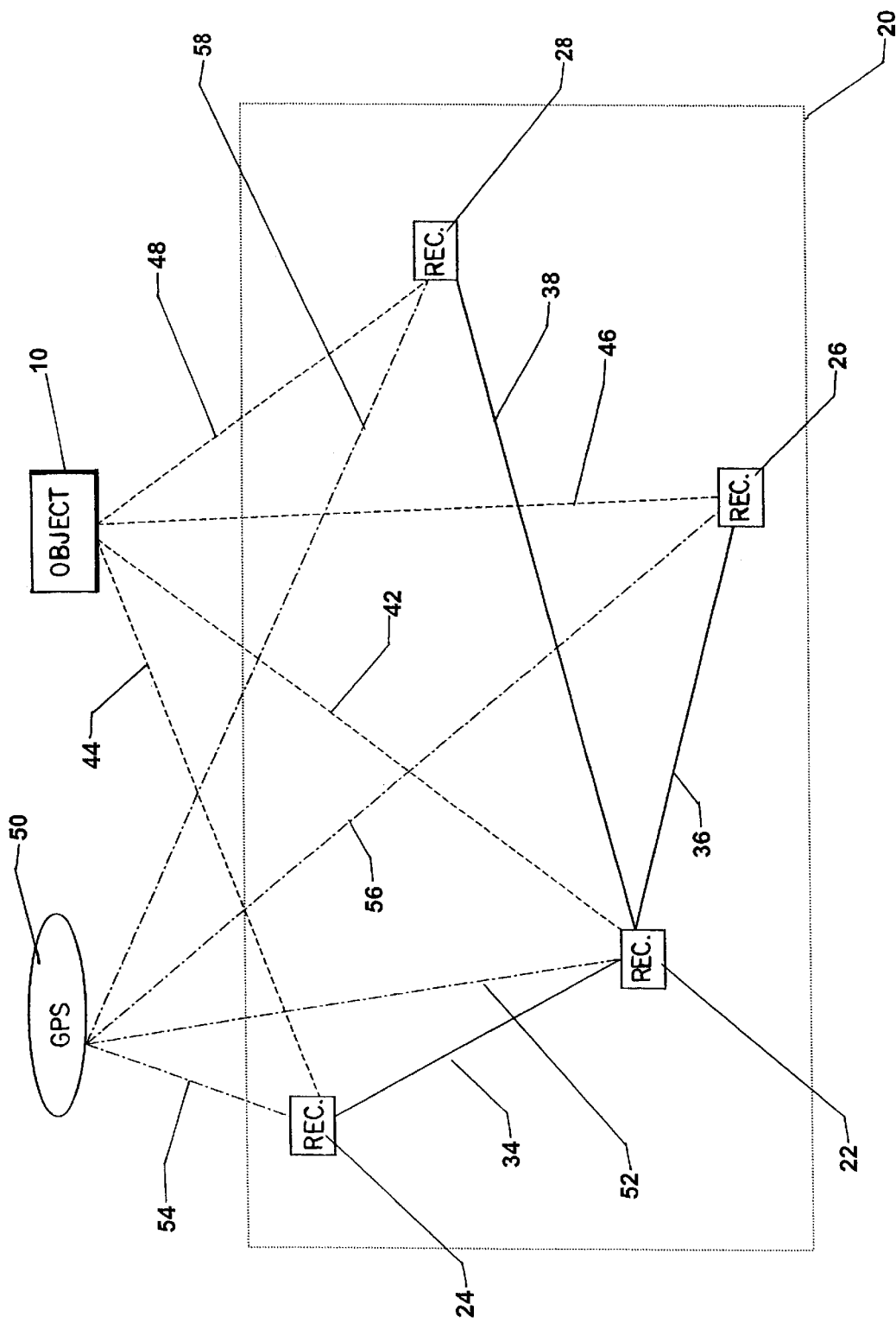
FIG. 1 illustrates a schematic diagram of an object location system in accordance with the present invention.

In FIG. 1, an object location system in accordance with the present invention is shown schematically. The position of an object 10, for example, an aircraft, is to be determined using a receiver array 20 indicated by dotted lines. Although the receiver array is shown having a rectangular configuration, this is not essential to the invention and the receiver array may comprise any suitable configuration. An optimum receiver geometry may be determined for aircraft concentrated within a specified volume of space. The optimum geometry corresponds to the combination of minimum height vector, defining the relationship between time measurement error and object positional error.

The aircraft 10 includes a secondary surveillance radar (SSR) system which can be interrogated by a signal from the ground, namely, from a separate interrogator (not shown) or from one of the receiver sites 22, 24, 26, 28 in the array 20 to produce an identifying signal for the aircraft 10. Alternatively, the SSR can transmit an identifying signal as a series of pulses. It will be appreciated that the present invention only requires that the aircraft provide some form of identifying signal and the form of the signal is immaterial.

The receiver array 20 comprises four receiver sites 22, 24, 26, 28. This is the minimum number of receiver sites which are required to determine the location of an aircraft. It may be necessary to use more than four receiver sites to maintain adequate coverage and positional accuracy over an extended volume of space. In the array 20, receiver site 22 is designated as a reference receiver site and the other receiver sites 24, 26, 28 as auxiliary receiver sites, but it is to be noted that any of the receiver sites could be designated as a reference receiver site.

Moreover, it is to be noted that in accordance with the present invention, there is no requirement for a 'line of sight' between the reference receiver site 22 and the auxiliary receiver sites 24, 26, 28 as timing signals are obtained by other means as is described in detail below.

Reference receiver site 22 is connected to the auxiliary receiver sites 24, 26, 28 by respective data links 34, 36, 38 as shown. The data links 34, 36, 38 transfer data between the reference site and the auxiliary sites as will be described in more detail later.

Each receiver site 22, 24, 26, 28 in the array 20 receives the signal from the aircraft 10 as illustrated by dotted lines 42, 44, 46, 48 respectively. It will be appreciated that the time it takes for the signal to reach each receiver site 22, 24, 26, 28 is different due to the differences in location of each site. Each receiver site 22, 24, 26, 28 also receives a global positioning system (GPS) signal from a GPS satellite 50 as indicated by chain lines 52, 54, 56, 58 respectively. The GPS signal is used as a timing signal at each receiver site.

Figure 2:
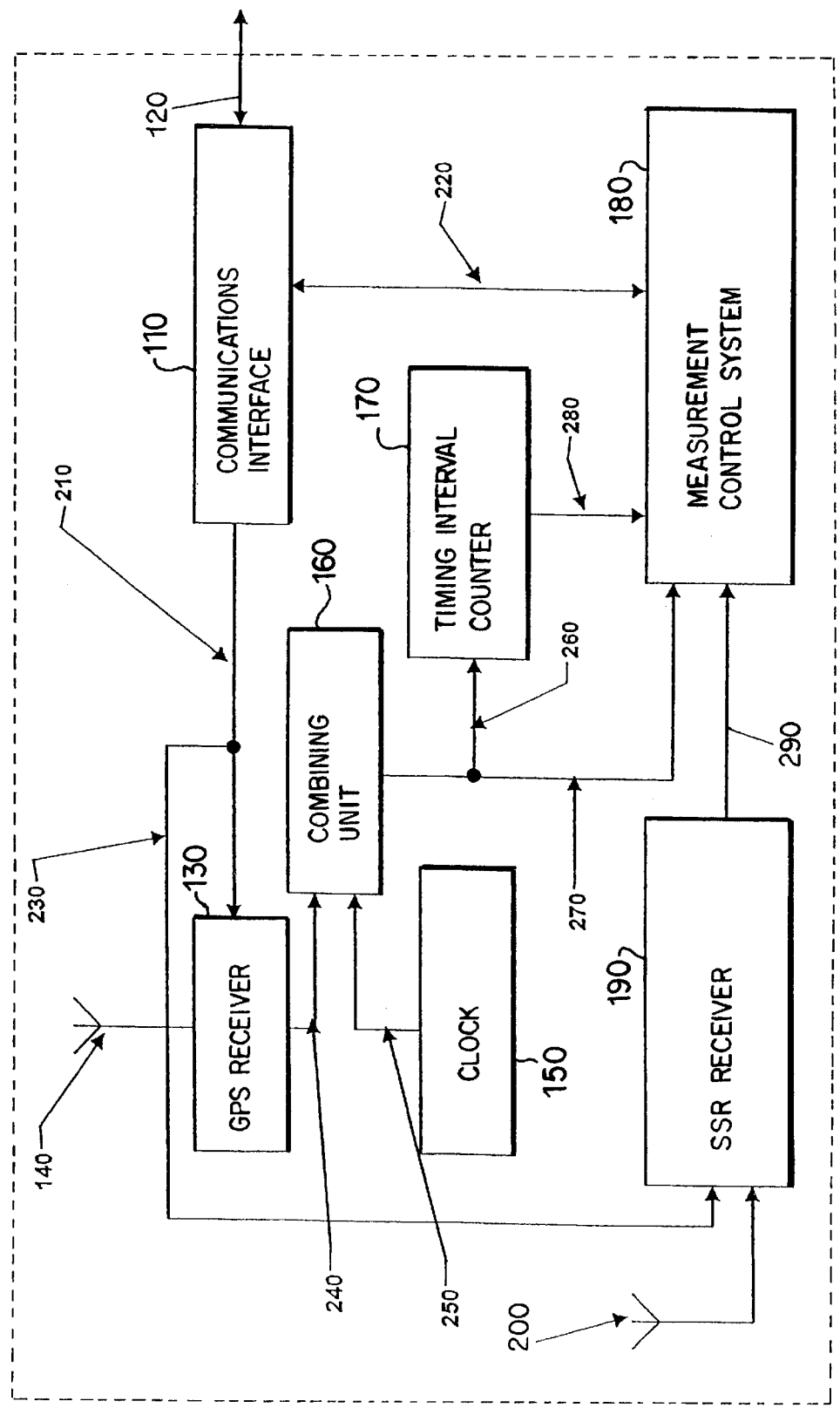
FIG. 2 illustrates a block diagram of a receiver site in the object location system of FIG. 1.

Referring now also to FIG. 2, a receiver site 100 is shown in the form of a block diagram. Any one of receiver sites 22, 24, 26, 28 shown in FIG. 1 may comprise receiver site 100. At receiver site 100, there is provided a communications interface 110 for providing a data link 120 with each of the auxiliary receiver sites 24, 26, 28, if the receiver site is the reference site 22, or with the reference receiver site 22 if the receiver site is an auxiliary receiver site 24, 26, 28. For simplicity, the receiver site 100 will be described as being an auxiliary receiver site.

The receiver site 100 also comprises a GPS receiver 130 having an antenna 140, a clock 150, a combining unit 160, a timing interval counter 170, a measurement control system 180, and a SSR receiver 190 having an antenna 200.

The communications interface 110 is connected to receive control signals from the reference receiver site 22 along the data link 120 and also to transmit data to the reference receiver site 22. The communications interface 110 is connected to the GPS receiver 130 via a link 210, to the SSR receiver 190 via link 230, and also to the measurement control system 180 via a link 220. Link 210 comprises a uni-directional link and operates to transmit an enable signal for the GPS receiver 130 from the reference receiver site 22.

Link 220 comprises a bi-directional link which connects the measurement control system 180 to the communications interface 110 and allows for data transfer between the measurement control system 180 and communications interface. The link 220 also serves to provide an enable signal for the measurement control system 180 as will be described in more detail below. Link 120 comprises a bi-directional link for both receiving data from and transmitting data to the reference receiver site 22.

As shown in FIG. 2, a connection 230 is also provided between the communications interface 110 and the SSR receiver 190 for providing an enable signal for the receiver 190.

GPS receiver 130 and clock 150 are both connected to the combining unit 160 by means of respective connections 240, 250. The output from the combining unit 160 is connected to the timing interval counter 170 via connection 260 and to the measurement control system 180 via connection 270. The timing interval counter 170 is also connected to the measurement control system 180 via a connection 280.

The operation of the object location system in accordance with the present invention will now be described in more detail.

The reference receiver site 22 transmits a signal along data links 34, 36, 38 to each of the auxiliary receiver sites 24, 26, 28 which effectively instructs each auxiliary receiver site to initiate measurement of the time for the SSR signal from the aircraft 10 to reach that receiver site. The signal on each data link 34, 36, 38 enters each auxiliary receiver site 24, 26, 28 on data link 120 via the communications interface 110. An enable signal is passed onto the GPS receiver 130 via link 210 and onto the SSR receiver 190 via link 230 and onto measurement control system 180 via link 220. The GPS receiver 130, once enabled, receives a signal from a GPS satellite (not shown) via its antenna 140 and supplies a timing signal to the combining unit 160 via connection 240. Clock 150, which comprises a high precision clock oscillator, provides clock signals to the combining unit 160 via connection 250.

In the combining unit 160, the timing signals received from the GPS receiver 130 and the clock signals from the clock 150 are combined to provide a precise clock reference signal. This clock reference signal is supplied to the time interval counter 170 and to the measurement control system 180 via respective connections 260 and 270 respectively. The clock reference signal on connection 260 provides trigger pulses to the time interval counter 170 which operates to generate a count indicative of the time from initiation and supplies it to the measurement control system 180 on connection 280. The measurement control system 150 also receives the clock reference signal as trigger pulses on connection 270 from the combining unit 160.

When a signal is received by the SSR receiver 190 via its antenna 200 from the aircraft 10, the measurement control system 180 receives a signal on connection 290 from the SSR receiver 190 and the time currently on the time interval counter 170 is stored in the measurement control system 180. The measurement control system 180 determines a time difference measurement between the signals received from the SSR receiver 190 on connection 290 and those received from the time interval counter 170 on connection 280. The time difference measurement determined by the measurement control system 180 is then passed to the communications interface 110 via link 220 for transmission to the reference receiver site 22 via link 120.

The combining unit 160 operates to provide the clock reference signal which counteracts any frequency drift in the clock 150 thereby providing long term stability.

At the reference receiver site 22, data signals from each of the auxiliary receiver sites 24, 26, 28 relating to the time difference measurements between the timing reference signal and the SSR signal received at each auxiliary receiver site are received. The measurement control system 180 of the reference receiver site 22 then processes the data signals from auxiliary receiver sites 24, 26, 28 and the time difference measurement obtained at the reference receiver site itself to provide an indication of the location of the aircraft 10 relative to the reference receiver site 22.

As the method of the present invention utilises GPS to establish an accurate reference timing, there is no requirement for there to be a 'line of sight' between the receiver sites in the receiver array. The receiver sites may be chosen to correspond to existing air traffic control centres. Each receiver may also comprise a mobile installation which facilitates re-configuration of the receiver array in accordance with changes in aircraft routing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of locating the position of an object which provides identifying signals, using a receiver array comprising a reference receiver site and at least three auxiliary receiver sites which are not on a line of sight with the reference receiver site, the method comprising the steps of:

receiving the identifying signals from the object at each receiver site;

receiving global navigation system signals from a global navigation system at each receiver site, and each receiver site using the received global navigation system signals for providing timing signals;

providing a clock at each receiver site for providing clock signals;

combining the timing signals with the clock signals to provide a timing reference signal at each receiver site;

determining a time difference between receiving the identifying signals and the timing reference signal at each receiver site;

transmitting data signals to the reference receiver site which are indicative of the determined time differences at each auxiliary receiver site; and calculating the position of the object using the transmitted data signals and a time difference determined at the reference receiver site.

2. Apparatus for locating an object producing identifying signals, the apparatus comprising:

a receiver array comprising a reference receiver site and at least three auxiliary receiver sites which are not on a line of sight with the reference receiver site;

a first receiver means at each receiver site for receiving the identifying signals from the object;

a second receiver means at each receiver site for receiving timing signals from a global navigation system;

clock means at each receiver site for generating clock signals;

combining means at each receiver site for combining the timing signals and clock signals to provide a timing reference signal;

processing means at each receiver site for receiving signals from the first receiver means and the combining means and for providing a time difference measurement from the received signals; and control means at the reference receiver site for receiving data signals from the auxiliary receiver sites indicative of the time difference measurement signals determined thereat, and for processing the data signals together with a time difference measurement from the reference receiver site, to provide a determination of the location of the object.

3. Apparatus according to claim 2, wherein the identifying signals from the object comprise secondary surveillance radar signals and the first receiver means comprises a secondary surveillance radar receiver.

4. Apparatus according to claim 2, wherein the clock means comprises a high precision clock oscillator.

5. Apparatus according to claim 2, wherein the processing means comprises, a time interval counter and a measurement control system.

6. Apparatus according to claim 2, wherein the processing means includes a communications interface for interfacing between each auxiliary receiver site and the reference receiver site.

* * * * *